(12) United States Patent
Hadav et al.

(10) Patent No.: US 12,259,845 B2
(45) Date of Patent: Mar. 25, 2025

(54) MANAGING COMMUNICATIONS BETWEEN CHASSIS

(71) Applicant: Dell Products L.P., Round Rock, TX (US)

(72) Inventors: Aric Hadav, Tel Aviv (IL); Amitai Alkalay, Kadima (IL); Boris Glimcher, Brooklyn, NY (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 18/230,884

(22) Filed: Aug. 7, 2023

(65) Prior Publication Data

US 2025/0053535 A1 Feb. 13, 2025

(51) Int. Cl.
*G06F 13/42* (2006.01)

(52) U.S. Cl.
CPC .. *G06F 13/4282* (2013.01); *G06F 2213/0026* (2013.01)

(58) Field of Classification Search
CPC ............. G06F 13/4282; G06F 13/1668; G06F 13/387; H04L 41/04; H04L 41/0226
See application file for complete search history.

(56) References Cited

U.S. PATENT DOCUMENTS

| | | | |
|---|---|---|---|
| 7,425,685 B1 | 9/2008 | Gundogan et al. | |
| 8,725,923 B1 | 5/2014 | Frangioso et al. | |
| 8,938,569 B1 | 1/2015 | Frangioso et al. | |
| 10,235,314 B2 | 3/2019 | Fricker | |
| 10,321,586 B1 | 6/2019 | Fricker | |
| 2015/0052283 A1* | 2/2015 | Ishii | G06F 13/1621 710/309 |
| 2016/0188216 A1* | 6/2016 | Bi | G06F 3/0674 710/313 |
| 2019/0004901 A1* | 1/2019 | Ryan | G06F 1/3253 |
| 2019/0087182 A1* | 3/2019 | Thomas | H04L 41/04 |
| 2019/0095377 A1* | 3/2019 | Brown | G06F 13/1673 |
| 2022/0114027 A1* | 4/2022 | Puthillathe | G06F 13/387 |
| 2022/0414045 A1* | 12/2022 | Yang | G06F 13/4282 |
| 2023/0208942 A1* | 6/2023 | Flag | H04L 69/18 370/466 |
| 2024/0045827 A1* | 2/2024 | Li | H04L 12/66 |

* cited by examiner

*Primary Examiner* — Phong H Dang
(74) *Attorney, Agent, or Firm* — BainwoodHuang (57) ABSTRACT

A technique of managing message between chassis includes forming a first message by a computing node in a first chassis. The first message complies with a first communications protocol and provides an instruction directed to a controller in a second chassis to manage one or more hardware functions of the second chassis. The controller operates in accordance with a second communications protocol that is different from the first communications protocol. The technique further includes transmitting both the first message and a set of I/O requests from the first chassis to the second chassis over a communications link configured to carry messages complying with the first communications protocol. The technique further includes converting, in the second chassis, the first message complying with the first communications protocol into a second message complying with the second communications protocol, the second message including the instruction directed to the controller.

18 Claims, 5 Drawing Sheets

MANAGING COMMUNICATIONS BETWEEN CHASSIS

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Components of storage systems are typically housed in one or more chassis. A chassis may contain a dedicated chassis manager, called a "base media controller" (BMC), which handles aspects of hardware management, e.g., temperature monitoring, fan control, inventory management, power management, event monitoring, etc. In a multi-chassis system, a BMC of one chassis may receive instructions from and send status updates to a computing node in a different chassis. For example, a computing node in a first chassis may exchange communications with a BMC of a second chassis to manage the hardware in the second chassis.

SUMMARY

Devices housed in chassis may transmit and receive different types of messages. For example, a device in a first chassis and a device in a second chassis may exchange data storage messages to read and write data on storage in one of the chassis. In another example, a computing node in the first chassis may send chassis management messages to a BMC in the second chassis to manage hardware functions of the second chassis. These different types of messages may be based on different communications protocols. For example, the BMC may be configured to send and receive messages in accordance with an Ethernet protocol, while data being written and read from storage devices may be transferred using an HTTP-based protocol, e.g., Redfish.

Various approaches have been proposed to manage communications between chassis. In one approach, one or more dedicated cables carry chassis management messages separately from data storage messages. For example, when chassis management messages are based on Ethernet protocol and data storage messages are based on a non-Ethernet protocol, a separate 1 GbE (Giga-bit Ethernet) cable may be used to send the chassis management messages between the chassis. In another approach, devices in both chassis use emulation to send and receive messages compliant with a non-native protocol. For example, a BMC that operates in accordance with a first communications protocol may run an emulator to mimic a BMC that operates in accordance with a second communications protocol.

Unfortunately, each of the above-described approaches involves its own deficiencies. For example, the use of dedicated cables creates potential points of failure, increases costs, and increases deployment and maintenance burdens. Further, the use of emulation consumes processor resources in both the source chassis and the destination chassis. Emulation may be particularly burdensome for a BMC, which is typically a small controller (e.g., a microcontroller) with limited processing power. What is needed is a more efficient way to communicate between chassis.

The above need is addressed at least in part by an improved technique of managing communications between a first chassis and a second chassis. The technique includes forming a first message by a computing node in a first chassis. The first message complies with a first communications protocol and provides an instruction directed to a controller in a second chassis to manage one or more hardware functions of the second chassis. The controller operates in accordance with a second communications protocol that is different from the first communications protocol. The technique further includes transmitting both the first message and a set of I/O requests from the first chassis to the second chassis over a communications link configured to carry messages complying with the first communications protocol. The set of I/O requests is directed to one or more storage devices in the second chassis and complies with the first communications protocol. The technique further includes converting, in the second chassis, the first message complying with the first communications protocol into a second message complying with the second communications protocol, the second message including the instruction directed to the controller.

Advantageously, the improved technique avoids the need to have a dedicated cable to transport chassis management messages between chassis. Instead, such chassis management messages may be sent over a communications link compatible with communications protocols used by other messages, e.g., I/O requests. Further, the improved technique avoids the need to emulate a controller that operates using a compatible protocol, improving the utilization of processing resources.

Certain embodiments are directed to a method of managing a message between chassis. The method includes forming a first message by a computing node in a first chassis. The first message provides an instruction directed to a controller in a second chassis to manage one or more hardware functions of the second chassis. Further, the first message complies with a first communications protocol. The controller operates in accordance with a second communications protocol that is a different protocol from the first communications protocol. The method further includes transmitting both the first message and a set of I/O requests from the first chassis to the second chassis over a communications link configured to carry messages complying with the first communications protocol. The set of I/O requests is directed to one or more storage devices in the second chassis and complies with the first communications protocol. The method further includes converting, in the second chassis, the first message complying with the first communications protocol into a second message complying with the second communications protocol, the second message including the instruction directed to the controller.

Other embodiments are directed to a computerized apparatus constructed and arranged to perform a method of managing a message between chassis, such as the method described above. Still other embodiments are directed to a computer program product. The computer program product stores instructions which, when executed on control circuitry of a computerized apparatus, cause the computerized apparatus to perform a method of managing a message between chassis, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique of managing communications between a first chassis and a second chassis includes forming a first message by a computing node in a first chassis. The first message provides an instruction directed to a controller in a second chassis to manage one or more hardware functions of the second chassis. Further, the first message complies with a first communications protocol. The controller operates in accordance with a second communications protocol that is a different protocol from the first communications protocol. The technique further includes transmitting both the first message and a set of I/O requests from the first chassis to the second chassis over a communications link configured to carry messages complying with the first communications protocol. The set of I/O requests is directed to one or more storage devices in the second chassis and complies with the first communications protocol. The technique further includes converting, in the second chassis, the first message complying with the first communications protocol into a second message complying with the second communications protocol, the second message including the instruction directed to the controller.

In some arrangements, the improved technique allows a first chassis to provide messages that comply with a first communications protocol to a controller that operates in accordance with a second communications protocol. A communications protocol is a set of shared rules that enable devices to exchange messages. Example communications protocols include Ethernet protocol, HTTP-based protocols (e.g., Redfish), and so forth.

In some arrangements, the first chassis is a disk processor enclosure (DPE). A DPE contains one or more computing nodes that perform data storage operations. A DPE may also monitor hardware in another chassis and provide instructions to manage hardware functions in the other chassis. In some arrangements, the second chassis is a disk array enclosure (DAE) that houses storage devices, e.g., magnetic disks drives, electronic flash drives, and so forth.

Figure 1:
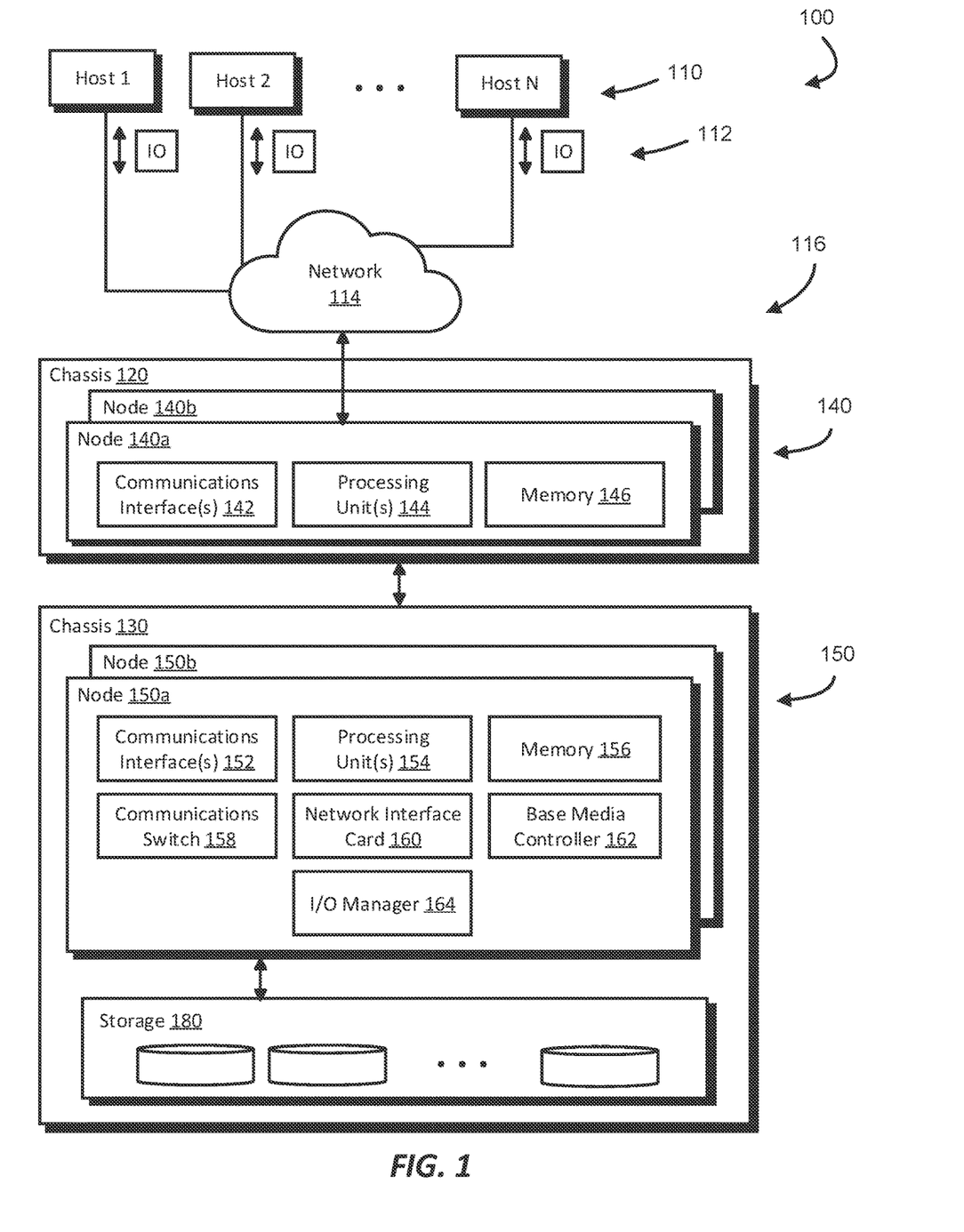
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more chassis (e.g., chassis 120, chassis 130, and so forth). Each chassis may contain devices that provide different functionality.

As shown, chassis 120 is a disk processor enclosure that houses one or more computing nodes 140 (e.g., node 140a and node 140b). As shown, chassis 130 is a disk array enclosure that houses one or more managing nodes 150 (e.g., node 150a and node 150b) and storage 180, such as magnetic disk drives, electronic flash drives, and/or the like. Nodes 140 and 150 may be provided as circuit board assemblies or blades mounted to a respective chassis. The data storage system 116 may include more or fewer chassis with the same or different functionality.

Each of the chassis 120 and 130 has a backplane or midplane for interconnecting the nodes 140 and/or 150, and additional connections may be made among nodes 140 and 150 using cables. In some examples, the nodes 140 and/or 150 are part of a storage cluster, such as one which contains any number of storage appliances, where each appliance includes a pair of nodes 140 and/or 150 connected to shared storage. In some arrangements, a host application runs directly on the nodes 140 and/or 150, such that separate host machines 110 need not be present. No particular hardware configuration is required, however, as any number of nodes 140 and/or 150 may be provided, including a single node, in any arrangement, and the node or nodes 140 and/or 150 can be any type or types of computing device capable of running software and processing host I/Os.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, ISCSI, and NVMeOF are block-based protocols, whereas NFS and CIFS are file-based protocols. The node 140a is configured to receive I/O requests 112 according to block-based and/or file-based protocols and to respond to such I/O requests 112 by reading or writing the storage 180.

As shown, the node 140a includes one or more communication interfaces 142, a set of processing units 144, and memory 146. The communication interfaces 142 include, for example, SCSI target adapters and/or network interface adapters for converting electronic and/or optical signals received over the network 114 to electronic form for use by the node 140a. The set of processing units 144 includes one or more processing chips and/or assemblies, such as numerous multi-core CPUs (central processing units). The memory 146 includes both volatile memory, e.g., RAM (Random Access Memory), and non-volatile memory, such as one or more ROMs (Read-Only Memories), disk drives, solid state drives, and the like. The set of processing units 144 and the memory 146 together form control circuitry, which is constructed and arranged to carry out various methods and functions as described herein. Also, the memory 146 includes a variety of software constructs realized in the form of executable instructions. When the executable instructions are run by the set of processing units 144, the set of processing units 144 is made to carry out the operations of the software constructs. Although certain software constructs are specifically shown and described, it is understood that the memory 146 typically includes many other software components, which are not shown, such as an operating system, various applications, processes, and daemons.

As shown, node 150a includes one or more communication interfaces 152, a set of processing units 154, and memory 156. The communication interfaces 152, the set of processing units 154, and memory 156 may be similar to the communication interfaces 142, the set of processing units 144, and memory 130 described above with regards to node 140a. Node 150a further includes a communications switch 158, a network interface card (NIC) 160, a base media controller (BMC) 162, and an I/O manager 164.

Communications switch 158 is configured to receive messages and route the messages to appropriate locations. The messages may originate from the same node as the node containing the communications switch 158 or may originate from a different node. For example, the communications switch 158 may receive I/O requests from the node 140a in chassis 120 to read or write data to storage 180. In response, the communications switch 158 may route the I/O requests to I/O manager 164. In another example, the communications switch 158 may receive instructions involving the management of hardware and route the instructions to base media controller 162. In yet another example, the communications switch 158 may receive a message to be forwarded to a different node in the same chassis or in another chassis. In some arrangements, the communications switch 158 is configured to send and receive messages in accordance with a particular communications protocol, e.g., an HTTP-based Redfish protocol.

Network interface card 160 is configured to convert messages that comply with one communications protocol into messages that comply with another communications protocol, and vice versa. In some arrangements, the network interface card 160 receives a first message directed to the base media controller 162. In such arrangements, the first message complies with a first communications protocol that is not used by the base media controller 162. In response, the network interface card 160 may convert the first message into a second message that complies with a second communications protocol used by the base media controller 162. The network interface card 160 may then provide the second message to the base media controller 162. Similarly, the network interface card 160 may receive a first response message from the base media controller 162, where the first response message complies with the second communications protocol. In response, the network interface card 160 may convert the first response message into a second response message complying with the first communications protocol.

It should be understood that, although the term "card" is part of the network interface card 160, the network interface card 160 may take a variety of different forms. For example, the network interface card 160 may be an expansion card, a computer chip, circuit definitions in a computer chip, and so forth. Use of the term "card" is not intended to limit the scope of the network interface card 160 in this regard.

Base media controller 162 is configured to manage hardware functions in chassis 130. In some arrangements, the base media controller 162 is configured to receive instructions from a node 140a in chassis 120 and is further configured to send status updates to the node 140a. In some arrangements, base media controller 162 manages aspects of hardware management including temperature monitoring, fan control, inventory management, power management, event monitoring, and so forth. In some arrangements, the base media controller 162 and the node 140a are configured to operate in accordance with different communications protocols.

I/O manager 164 is configured to receive and execute I/O requests directed to storage 180. For example, I/O manager 164 may receive a request to read data from or write data to storage 180. In some arrangements, I/O manager is configured to operate in accordance with the same communications protocol as the communications switch 158.

In example operation, the hosts 110 issue I/O requests 112 to the data storage system 116. A node 140a in a first chassis 120 receives the I/O requests 112 at the communication interfaces 142 and initiates further processing. Such processing may involve forwarding the I/O requests 112 from the node 140a in the first chassis 120 to the node 150a in a second chassis 130. Simultaneously or at a desired time, the node 140a in chassis 120 may communicate with base media controller 162 in chassis 130 to monitor and manage hardware functions of chassis 130.

Figure 2:
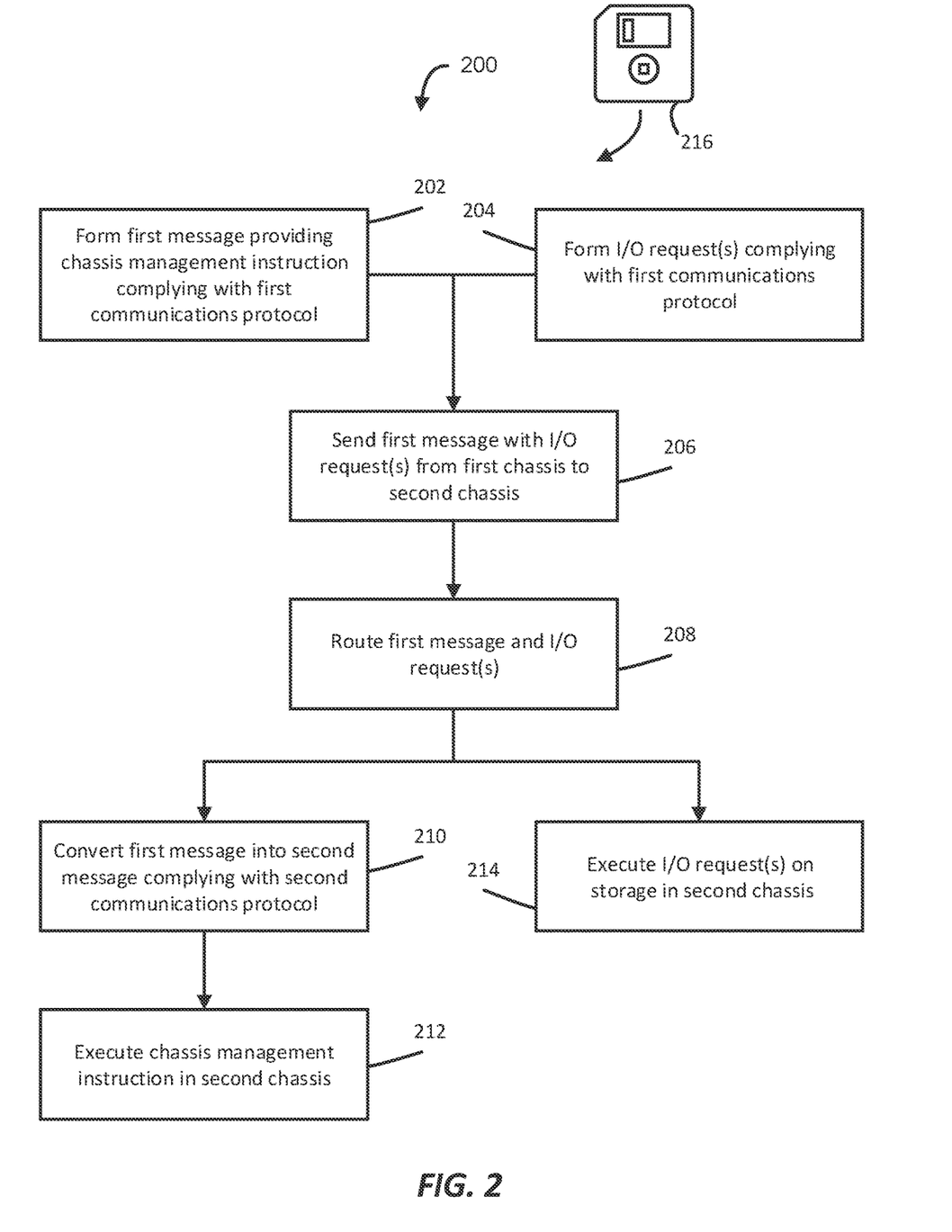
FIG. 2 is a flowchart showing example activities that may be performed in the environment of FIG. 1.

FIG. 2 shows an example method 200 that may be performed by and/or directed by the data storage system 116. Method 200 enables a node in a first chassis to manage hardware functions in a second chassis by providing messages complying with a first communications protocol. The messages are directed to a controller in a second chassis. In some arrangements, the controller operates in accordance with a second communications protocol that is a different protocol from the first communications protocol.

At 202, a node 140a in a first chassis 120 forms a first message providing a chassis management instruction. The instruction is directed to a base media controller 162 in a second chassis 130 and provides for management of one or more hardware functions of the second chassis 130. The first message complies with a first communications protocol. In some arrangements, the first communications protocol is an HTTP-based protocol, e.g., Redfish.

At 204, the node 140a forms a set of I/O requests directed to storage 180 in the second chassis 130. Forming the set of I/O requests may occur before, after, and/or simultaneously with forming the first message in act 202. Like the first message, the set of I/O requests complies with the first communications protocol.

At 206, the node 140a transmits both the first message and the set of I/O requests from the first chassis 120 to the second chassis 130. The first message and the set of I/O requests are sent over the same communications link. In some arrangements, the communications link is a cable connecting the chassis 120 and chassis 130. In some arrangements, a node 140a sends the first message and the set of I/O requests to a communications switch 158 in the second chassis 130. In such arrangements, the communications switch 158 is configured to send and receive messages complying with the first communications protocol.

At 208, the communications switch 158 routes the first message and the set of I/O requests. In some arrangements, the communications switch 158 provides the first message to a network interface card 160 for further processing. In some arrangements, the communications switch 158 provides the set of I/O requests to an I/O manager 164.

At 210, the network interface card 160 converts the first message into a second message complying with the second communications protocol. The second message includes the instruction provided in the first message to manage the one or more hardware functions of the second chassis 130. In some arrangements, the base media controller 162 operates in accordance with a second communications protocol that is a different protocol from the first communications protocol. In some arrangements, the second communications protocol is an Ethernet protocol.

At 212, the base media controller 162 receives the second message from the network interface card 160 and executes the instruction in the second chassis. In this manner, the node 140a in the first chassis 120 may direct the base media controller 162 in the second chassis 130 to manage hardware functions in the second chassis 130.

At 214, the I/O manager 164 executes the set of I/O requests on storage 180 in the second chassis. Executing the set of I/O requests may occur before, after, and/or simultaneously with converting the first message into the second message (act 210) or executing the instruction (act 212).

Advantageously, method 200 allows the base media controller 162 to operate in accordance with a different protocol from the communications protocol used to transfer I/O requests between chassis. These features enable a reduction in the number of cables needed to transport chassis management communications between chassis. Further, these features avoid the need to emulate a controller that operates uses a compatible communications protocol when sending communications between chassis, improving the utilization of processing resources.

Figure 3:
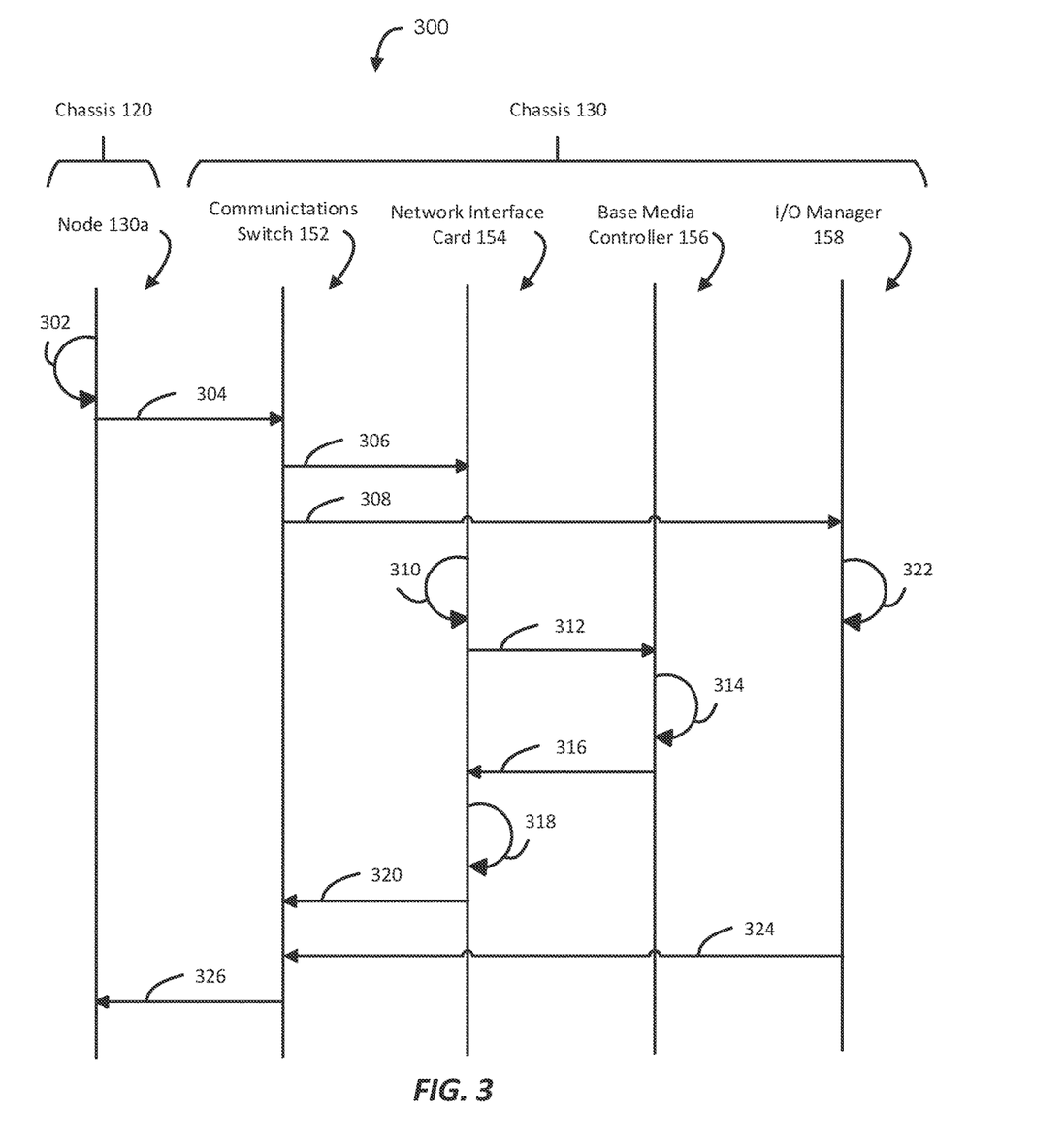
FIG. 3 is a flowchart showing example activities that may be performed in the environment of FIG. 1.

FIG. 3 shows an example method 300 that may be performed by and/or directed by the data storage system 116. Method 300 is directed to sending messages from a first chassis to a second chassis and returning a response to the messages.

At 302, a node 140a in a first chassis 120 forms a first message providing a chassis management instruction directed to a second chassis 130. Additionally, the node 140a forms a set of I/O requests. Both the first message and the set of I/O requests comply with the first communications protocol. At 304, the node 140a provides the first message and the set of I/O requests to a communications switch 158 in the second chassis 130 using a communications link compatible with the first communications protocol.

At 306, the communications switch 158 routes the first message to a network interface card 160. Likewise, at 308, the communications switch 158 routes the set of I/O requests to a I/O manager 164. Acts 306 and 308 may occur simultaneously or one after the other.

At 310, the network interface card 160 converts the first message into a second message complying with the second communications protocol. The second message contains the instructions provided in the first message for managing the hardware functions of the second chassis 130. At 312, the network interface card 160 provides the second message to a base media controller 162 that manages hardware functions of the second chassis 130. In some arrangements, the second communications protocol is natively-supported on the base media controller 162. In this manner, base media controller 162 may execute the instructions contained in the second message without spending processor power to emulate a controller compatible with the first communications protocol. In this manner, these features enable an improvement to the utilization of processor resources.

At 314, the base media controller 162 executes the instruction provided in the second message. At 316, the base media controller 162 returns a first response message complying with the second communications protocol.

At 318, the network interface card 160 converts the first response message into a second response message complying with the first communications protocol. At 320, the network interface card 160 provides the second response message to the communications switch 158.

At 322, the I/O manager 164 executes the set of I/O requests. At 324, the I/O manager 158 provides a set of I/O responses to the communications switch 158. For example, the I/O manager may return data as a response to a read request. In another example, the I/O manager may return an indication that a write request was successfully completed. In some arrangements, the set of I/O responses complies with the first communications protocol. Acts 322 and 324 may occur before, after, or simultaneously with any of acts 310 through 320.

At 326, the communications switch 158 provides the second response message and the set of I/O responses to the node 140a. In some arrangements, the messages are sent over the same communications link that was used to send the first message and the set of I/O requests.

Figure 4:
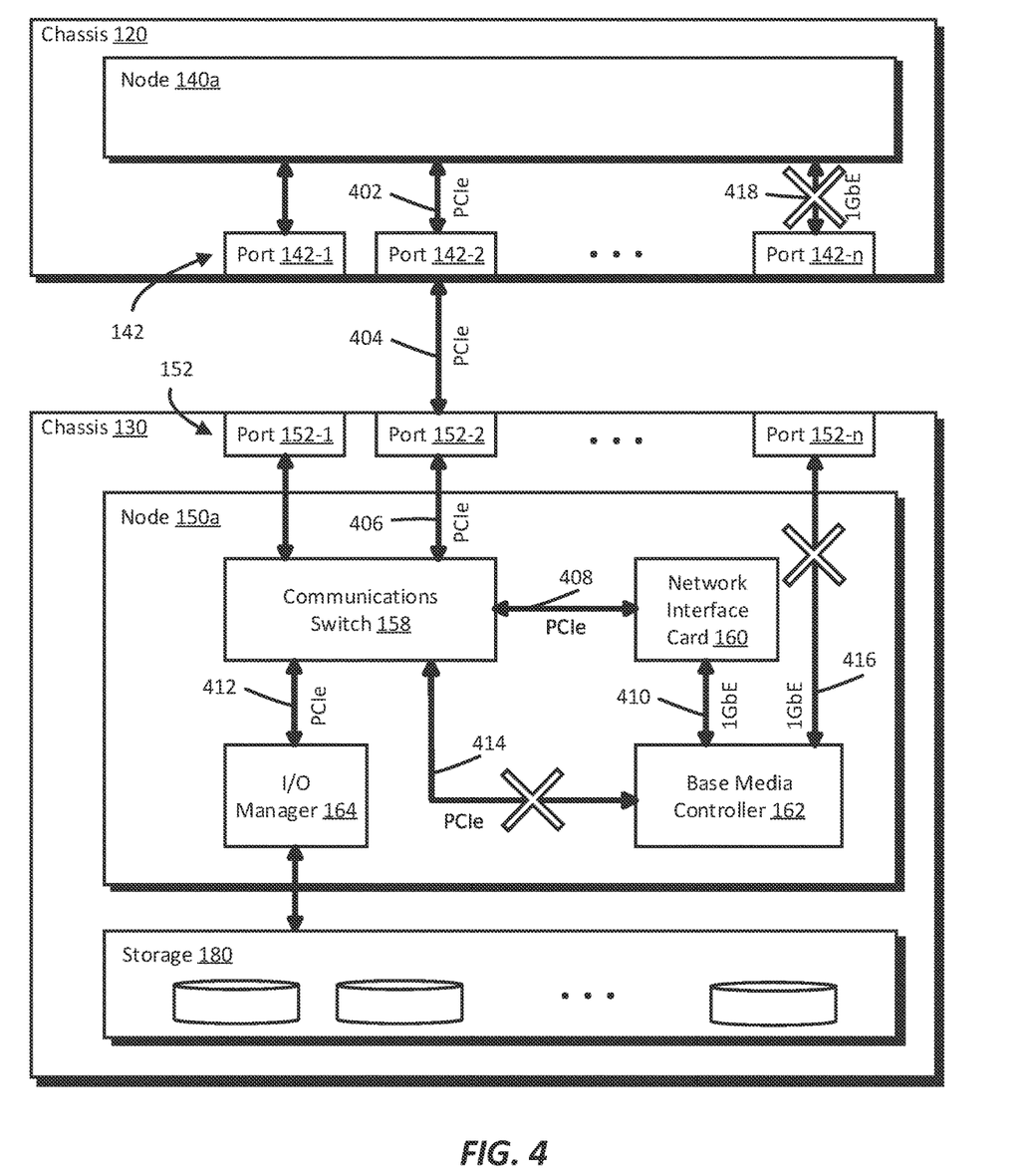
FIG. 4 is a block diagram showing an example arrangement involving two chassis.

FIG. 4 shows an example arrangement for managing a message between chassis. FIG. 4 includes a first chassis 120 that houses node 140a and houses communication interfaces 142 (e.g., ports 142-1 through 142-n). FIG. 4 further includes a second chassis 130 that houses node 150a, houses communication interfaces 152 (e.g., ports 152-1 through 152-n), and houses storage 180. It should be understood that communication interfaces 142 and 152 are provided for example purposes, and more or fewer ports may be provided.

Node 140a in the first chassis 120 is configured to provide messages that comply with a first communications protocol. Node 140a is connected to port 142-2 via link 402. As shown, link 402 is configured to carry messages using an HTTP-based Redfish protocol over a PCIe transport layer (Redfish over PCIe).

The first chassis 120 and the second chassis 130 are connected via link 404. As shown, link 404 is a cable configured to carry messages complying with the first communications protocol. In some arrangements, node 140a is configured to recognize insertion of new devices while the node 140a is running (called "hot insertion"). For example, in response to connecting link 404 to ports 142-2 and 152-2, node 140a may receive a hot-insertion signal that identifies network interface card 160 as a new device. In response to receiving the hot-insertion signal, node 140a may load a driver corresponding to network interface card 160 that enables communications between the node 140a and the network interface card 160. Thereafter, node 140a may send instructions to the network interface card 160 that are converted into messages for the base media controller 162 connected to the network interface card 160.

The communications switch 158 receives the first message and the set of I/O requests via port 152-2 and link 406. Similar to links 402 and 404, link 406 is configured to carry messages complying with the first communications protocol. The communications switch 158 is configured to routes the first message and the set of I/O requests to appropriate locations. For example, the communications switch 158 may send the set of I/O requests to the I/O manager 164 via link 412. The I/O manager 164 may then execute the set of I/O requests by accessing storage 180.

Similarly, the communications switch 158 may send the first message to the network interface card 160 via link 408. Note that, as shown, the communications switch 158 is also connected directly to base media controller 162 via link 414. Although the communications switch 158 may be capable of sending the first message that complies with the first communications protocol directly to the base media controller 162, in some arrangements, the base media controller 162 is not configured to operate in accordance with the first communications protocol. By sending the first message to the network interface card 160 rather than the base media controller 162 directly, the network interface card 160 can convert the first message into a second message complying with a second communications protocol that is compatible with the base media controller 162. The network interface card 160 then provides the base media controller 162 with the second message via link 410. As shown, link 410 is a 1 GbE (Giga-bit Ethernet) connection that carries messages complying with an Ethernet protocol.

Advantageously, using the network interface card 160 to convert messages enables the base media controller 162 to send and receive messages that comply with its natively-supported communications protocol. In this manner, base media controller 162 may operate without emulating a controller that operates in accordance with a different communications protocol. In this manner, these features enable an improvement to the utilization of processor resources.

Additionally, by sending and receiving messages through network interface card 160, the base media controller 162 may communicate with node 140*a* in the first chassis using the same cable used to perform data storage operations. In this manner, chassis management messages may be transmitted between chassis without a dedicated cable. For example, as shown, base media controller 162 in the second chassis 130 is connected to an external port 152-*n* via a 1 GbE link 416, and node 140*a* in the first chassis 120 is connected to an external port 142-*n* via a 1 GbE link 418. Although these connections may enable the node 140*a* and the base media controller 162 to communicate over Ethernet, messages between the chassis may be transmitted over the link 404. In this manner, these features enable a reduction in cables that provide potential points of failure, an increase in costs, and an increase in deployment and maintenance burdens.

Figure 5:
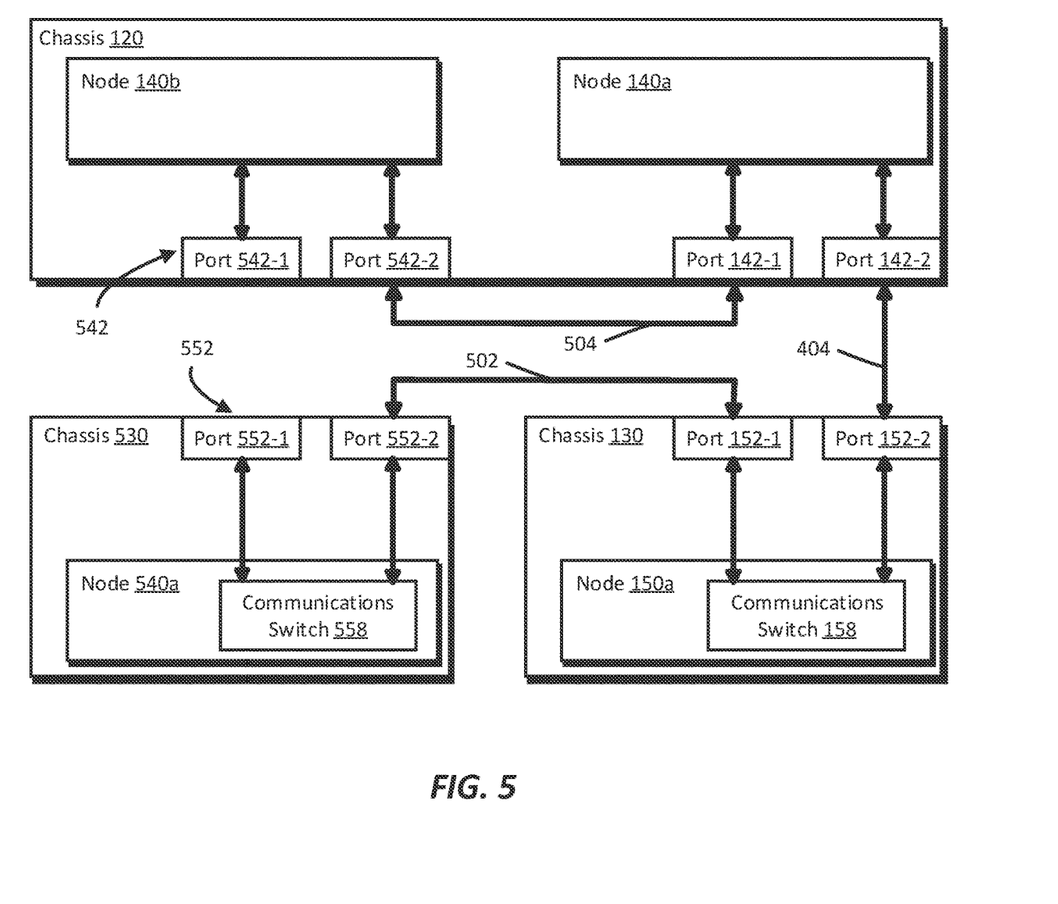
FIG. 5 is a block diagram showing an example arraignment involving multiple chassis.

FIG. 5 shows an example arrangement in which devices in multiple chassis are connected in series (e.g., a "daisy chain"). As shown, a first node 140*a* in a first chassis 120 is connected to a second chassis 130 via link 404. The second chassis 130 is further connected to a third chassis 530 via link 502. The first chassis may also include a second node 140*b* connected to the first node 140*a* via link 504. It should be understood that FIG. 5 provides simplified views of the multiple chassis, and each chassis may house additional componentry, such as a network interface card, a base media controller, an I/O manager, storage, and so forth. The additional componentry may perform similar functions as those described above. Further, each chassis may include any number of nodes connected in the same or different manners.

In FIG. 5, the node 140*a* in the first chassis 120 is configured to manage hardware functions of both the second chassis 130 and the third chassis 530. Additionally, the communications switch 158 in the second chassis 130 is configured to receive and route communications directed to devices in the second chassis 130 or the third chassis 530. For example, the node 140*a* in the first chassis 120 may send a message to communications switch 158 in the second chassis 130 via link 404. The message may contain instructions directed to a base media controller in the third chassis 530. Upon receiving the message, the communications switch 158 in the second chassis 130 may route the message to the third chassis 530 via link 502. In the same manner, the node 140*a* may send, and the communications switch 158 may route I/O requests directed to storage in the third chassis 530. In some arrangements, both link 404 and link 502 are configured to carry messages complying with the same communications protocol.

Further, as discussed above, node 140*a* is configured to recognize hot insertion of new devices. In some arrangements, node 140*a* recognizes hot insertion even when the devices are not directly connected to node 140*a*. For example, in response to connecting link 502 to ports 152-1 and 552-2, node 140*a* may receive a hot-insertion signal that identifies a network interface card in chassis 530 as a new device. In response to receiving the hot-insertion signal, node 140*a* may load a driver corresponding to the network interface card in chassis 530 that enables communications between the node 140*a* and the network interface card.

An improved technique has been described for managing a message between chassis. The technique includes forming a first message by a computing node in a first chassis. The first message provides an instruction directed to a controller in a second chassis to manage one or more hardware functions of the second chassis. Further, the first message complies with a first communications protocol. The controller operates in accordance with a second communications protocol that is a different protocol from the first communications protocol. The technique further includes transmitting both the first message and a set of I/O requests from the first chassis to the second chassis over a communications link configured to carry messages complying with the first communications protocol. The set of I/O requests is directed to one or more storage devices in the second chassis and complies with the first communications protocol. The technique further includes converting, in the second chassis, the first message complying with the first communications protocol into a second message complying with the second communications protocol, the second message including the instruction directed to the controller.

Having described certain embodiments, numerous alternative embodiments or variations can be made. For example, although some arrangements have been described with reference to chassis 120 and chassis 130, these chassis are merely an example. Other embodiments may include chassis housing more or fewer nodes. Further, other embodiments may use different communications protocols, Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 216 in FIG. 2). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing a message between chassis, comprising:
   forming a first message by a computing node in a first chassis, the first message providing an instruction directed to a controller in a second chassis to manage one or more hardware functions of the second chassis, the first message complying with a first communications protocol, the controller operating in accordance with a second communications protocol that is a different protocol from the first communications protocol;
   transmitting both the first message and a set of I/O requests from the first chassis to the second chassis over a communications link configured to carry messages complying with the first communications protocol, the set of I/O requests directed to one or more storage devices in the second chassis and complying with the first communications protocol; and
   converting, in the second chassis, the first message complying with the first communications protocol into a second message complying with the second communications protocol, the second message including the instruction directed to the controller.

2. A method of claim 1, further comprising, after converting the first message into the second message, executing the instruction included in the second message by the controller to manage the one or more hardware functions of the second chassis.

3. A method of claim 2, wherein the second chassis includes a network interface card (NIC) coupled to the controller, the NIC receiving the first message; and
   wherein converting the first message into the second message is performed by the NIC.

4. A method of claim 3, wherein the second chassis further includes a communications switch configured to direct messages to the NIC and to an I/O manager in the second chassis; and
   wherein the method further comprises:
      transmitting the first message from the communications switch to the NIC; and
      transmitting the set of I/O requests to the I/O manager to service the set of I/O requests.

5. A method of claim 3, wherein the communications link is a cable connected between a first communications port of the first chassis and a second communications port of the second chassis; and
   wherein the method further comprises:
      in response to the cable being connected between the first communications port and the second communications port, receiving a hot-insertion signal by the computing node in the first chassis, the hot-insertion signal identifying the NIC; and
      in response to receiving the hot-insertion signal, loading a driver by the computing node to access the NIC in accordance with the first communications protocol.

6. A method of claim 1, further comprising:
   forming a first response message by the controller in the second chassis, the first response message complying with the second communications protocol;
   converting, in the second chassis, the first response message into a second response message complying with the first communications protocol; and
   sending the second response message from the second chassis to the first chassis.

7. A method of claim 1, further comprising:
   forming a third message by the computing node in the first chassis, the third message providing a second instruction directed to a second controller in a third chassis to manage one or more hardware functions of the third chassis, the third message complying with the first communications protocol, the second controller operating in accordance with the second communications protocol;
   transmitting the third message and a second set of I/O requests from the first chassis to the second chassis over the communications link, the second set of I/O requests directed to a second set of storage devices in the third chassis and complying with the first communications protocol;
   transmitting both the third message and the second set of I/O requests from the second chassis to the third chassis over a second communications link; and
   converting, in the third chassis, the third message into a fourth message complying with the second communications protocol, the fourth message including the second instruction directed to the second controller.

8. The method of claim 7, wherein sending the third message from the second chassis to the third chassis includes providing the third message over a cable connected between the second chassis and the third chassis.

9. A method of claim 1, wherein sending the first message includes transferring the first message over a transport layer compatible with the first communications protocol, the transport layer providing the communications link.

10. A method of claim 9, wherein the transport layer is a peripheral component interconnect express (PCIe) transport layer.

11. A method of claim 1, wherein the first communications protocol is a HTTP-based protocol and the second communications protocol is an Ethernet protocol.

12. A storage system, comprising:
a first chassis including a computing node configured to form messages complying with a first communications protocol;
a second chassis including a controller operating in accordance with a second communications protocol that is a different protocol from the first communications protocol, the first chassis and the second chassis connected over a communications link configured to carry the messages complying with the first communications protocol, the first chassis and the second chassis including control circuitry that includes a set of processors coupled to memory, the control circuitry constructed and arranged to:
form a first message by the computing node in a first chassis, the first message providing an instruction directed to the controller in a second chassis to manage one or more hardware functions of the second chassis, the first message complying with the first communications protocol;
transmit both the first message and a set of I/O requests from the first chassis to the second chassis over the communications link, the set of I/O requests directed to one or more storage devices in the second chassis and complying with the first communications protocol; and
convert, in the second chassis, the first message into a second message complying with the second communications protocol, the second message including the instruction directed to the controller.

13. A storage system of claim 12, wherein the computerized circuitry is further constructed and arranged to, after converting the first message into the second message, execute the instruction included in the second message by the controller to manage the one or more hardware functions of the second chassis.

14. A storage system of claim 13, wherein the second chassis includes a network interface card (NIC) coupled to the controller, the NIC receiving the first message; and
wherein converting the first message into the second message is performed by the NIC.

15. A storage system of claim 14, wherein the second chassis further includes a communications switch configured to direct messages to the NIC and to an I/O manager in the second chassis; and
wherein the computerized circuitry is further constructed and arranged to:

transmit the first message from the communications switch to the NIC; and
transmit the set of I/O requests to the I/O manager to service the set of I/O requests.

16. A storage system of claim 14, wherein the communications link is a cable connected between a first communications port of the first chassis and a second communications port of the second chassis; and
wherein the computerized circuitry is further constructed and arranged to:
in response to the cable being connected between the first communications port and the second communications port, receive a hot-insertion signal by the computing node in the first chassis, the hot-insertion signal identifying the NIC; and
in response to receiving the hot-insertion signal, load a driver by the computing node to access the NIC in accordance with the first communications protocol.

17. A storage system of claim 12, wherein the computerized circuitry is further constructed and arranged to:
form a first response message by the controller in the second chassis, the first response message complying with the second communications protocol;
convert, in the second chassis, the first response message into a second response message complying with the first communications protocol; and
send the second response message from the second chassis to the first chassis.

18. A computer program product including a set of non-transitory, computer-readable media having instructions which, when executed by control circuitry of a computerized apparatus, cause the computerized apparatus to perform a method of managing a message between chassis, the method comprising:
forming a first message by a computing node in a first chassis, the first message providing an instruction directed to a controller in a second chassis to manage one or more hardware functions of the second chassis, the first message complying with a first communications protocol, the controller operating in accordance with a second communications protocol that is a different protocol from the first communications protocol;
transmitting both the first message and a set of I/O requests from the first chassis to the second chassis over a communications link configured to carry messages complying with the first communications protocol, the set of I/O requests directed to one or more storage devices in the second chassis and complying with the first communications protocol; and
converting, in the second chassis, the first message into a second message complying with the second communications protocol, the second message including the instruction directed to the controller.

* * * * *